(12) United States Patent  
Guo

(10) Patent No.: US 12,296,865 B2
(45) Date of Patent: May 13, 2025

(54) ROPEWAY SELF-PROPELLED TRANSPORTING EQUIPMENT

(71) Applicant: Yanwei Guo, Guangdong (CN)

(72) Inventor: Yanwei Guo, Guangdong (CN)

( * ) Notice: Subject to any disclaimer, the term of this patent is extended or adjusted under 35 U.S.C. 154(b) by 869 days.

(21) Appl. No.: 17/439,413

(22) PCT Filed: May 17, 2019

(86) PCT No.: PCT/CN2019/087415
§ 371 (c)(1),
(2) Date: Sep. 15, 2021

(87) PCT Pub. No.: WO2020/186618
PCT Pub. Date: Sep. 24, 2020

(65) Prior Publication Data
US 2022/0185342 A1 Jun. 16, 2022

(30) Foreign Application Priority Data

Mar. 16, 2019 (CN) .......................... 201910200590.5

(51) Int. Cl.
B61B 7/06 (2006.01)
B61B 12/10 (2006.01)
B61B 12/12 (2006.01)

(52) U.S. Cl.
CPC ................ B61B 7/06 (2013.01); B61B 12/10 (2013.01); B61B 12/122 (2013.01)

(58) Field of Classification Search
CPC .......... B61B 7/06; B61B 12/122; B61B 12/10
(Continued)

(56) References Cited

U.S. PATENT DOCUMENTS 3,429,279 A * 2/1969 Pomagalski ............ B61B 12/02
104/173.1
3,498,236 A * 3/1970 Meek ........................ B61B 7/06
105/51

(Continued)

Primary Examiner — Zachary L Kuhfuss
Assistant Examiner — Heaven R Buffington

(57) ABSTRACT

Ropeway self-propelled transporting equipment, comprising a transporting device (1) which runs along a ropeway rope, wherein the transporting device (1) comprises a sliding adjusting mechanism (2), a transmission mechanism (3) and a pull arm (4); and the sliding adjusting mechanism (2) and the transmission mechanism (3) are movably connected to the pull arm (4) respectively. The sliding adjusting mechanism (2) is arranged on the pull arm (4), and a first transmission component (21), a second transmission component (22) and a third transmission component (23) of the sliding adjusting mechanism (2) enclose a ropeway rope clamping area. When the ropeway rope is positioned in the ropeway rope clamping area, the ropeway rope is clamped to the first transmission component (21), the second transmission component (22) and the third transmission component (23) so that the transporting device (1) may freely slide along the ropeway rope. In addition, a first lifting component (20) is provided on the sliding adjusting mechanism (2). The ropeway rope clamping area may adapt to ropeway ropes of different sizes and smoothly traverse a ropeway rope junction or a ropeway support bend. Therefore, the applicability of the present transporting device (1) is improved.

11 Claims, 12 Drawing Sheets

(58) Field of Classification Search
USPC ............................................. 104/173.1, 112
See application file for complete search history.

(56) References Cited

U.S. PATENT DOCUMENTS

| | | | | | |
|---|---|---|---|---|---|
| 4,590,863 | A | * | 5/1986 | Lozen | ...................... B61F 17/28 |
| | | | | | 184/106 |
| 6,050,198 | A | * | 4/2000 | Gersemsky | ................ B66C 9/14 |
| | | | | | 105/153 |
| 6,494,141 | B2 | * | 12/2002 | Montambault | .......... H02G 1/02 |
| | | | | | 104/112 |
| 6,910,425 | B2 | * | 6/2005 | Galpin | .................... B61C 13/04 |
| | | | | | 105/155 |
| 8,082,853 | B2 | * | 12/2011 | Heil | ........................ B61B 12/02 |
| | | | | | 104/197 |
| 8,393,277 | B2 | * | 3/2013 | Johnston | ................... B61B 3/02 |
| | | | | | 104/238 |

* cited by examiner

ROPEWAY SELF-PROPELLED TRANSPORTING EQUIPMENT

BACKGROUND OF THE INVENTION

The present invention relates to a transport facility, in particular relates to a cableway self-propelled transport facility.

A cableway, also called crane or cable car (wherein a cable car also refers to a funicular railway), is a means of transportation; it usually carries passengers or goods to go up and down rugged hillsides. A cableway utilizes the steel cables suspending in the air to bear and pull passenger or goods cars. Unless at stations, in general, some support bearing steel cables is built at certain distances and the cable cars are suspended under the steel cables.

There are two kinds of cable cars at present; one kind is that a cable car is suspended under the cableway, the driving mechanism drives the steel cable and the steel cable pulls the carriage travel along the cableway to transport goods or people; this kind of cable cars are mostly used as a means of transportation in mining areas, cities or scenic spots; however, this kinds of cable cars pulled by steel cables suffer much limit in respect of traveling distances and tracks; therefore, this kind is not suitable for traveling on complicated and long-distance cable ways. The other kind is a cableway self-driven device; to be specific, the cable car is suspended under the cableway and travels without the steel cable to pull and can freely make turns; therefore, this kind is suitable for traveling on complicated and long-distance cable ways.

However, the driving devices of the existing self-propelled cable cars are relatively complicated; for example, a cable car is driven by its rubber wheels to slide along the cableway; the rubber wheels act on the premise that the internal combustion engine drives the hydraulic pump which drives the rubber wheels to act; in this circumstance, the energy consumption is huge and the hydraulic pump easily goes wrong and causes low reliability of the driving device; for example, a cable car is clamped onto the cableway through the crawler belt clips so that the crawler belt generates friction with the cableway; when the internal combustion engine drives the crawler belt to move, the cable car travels along the cableway; however, the number of rubber wheel clips or crawler belts driven by the internal combustion engine is limited and not conducive to large-scale transportation; in addition, it is difficult to maintain the hydraulic system and the crawler belt clips; therefore, the transportation costs of cable cars is increased.

Further, I submitted the patent application for a cable car self-propelled transport facility to China National Intellectual Property Administration on Jun. 30, 2018; the above-mentioned facility is an up-down arm-type structure, in the process of traveling along the cableway, the transport device cannot make turns smoothly, and two driving wheels of each unit come into insufficient contact with the cableway rope.

BRIEF SUMMARY OF THE INVENTION

The purpose of the present invention is to provide a cableway self-propelled transport facility with a simple and reliable structure and the transport device traveling along the cableway and makings turns smoothly.

The purpose of the present invention is realized as follows:

A cableway self-propelled transport facility comprises at least one transport device traveling along the cableway rope; the transport device comprises a slide regulating mechanism, a transmission mechanism and a pull arm; the slide regulating mechanism and the transmission mechanism are in flexible connection with the pull arm respectively;

The slide regulating mechanism comprises the first lifting subassembly, the first transmission subassembly, the second transmission subassembly, the third transmission subassembly, a first connecting rod, a second connecting rod, a third connecting rod and a fourth connecting rod; the first lifting subassembly is movably suspended on the first transmission subassembly; the first lifting subassembly comprises a first sliding block which can be lifted up and down, the second transmission subassembly and the third transmission subassembly are located on both sides of the first transmission subassembly respectively, the second transmission subassembly and the first transmission subassembly are connected through the first connecting rod, the second transmission subassembly and the first sliding block are connected through the second connecting rod, the third transmission subassembly and the first transmission subassembly are connected through the third connecting rod, the third transmission subassembly and the first sliding block are connected through the fourth sliding block; the first transmission subassembly, the second transmission subassembly and the third transmission subassembly form the cableway rope clamping area; the first lifting subassembly regulates the clamping degree of the cableway rope clamping area, or lowers the second transmission subassembly and the third transmission subassembly at the cableway rope joints and turns so that a second driving wheel and a third driving wheel are temporarily separated from the cableway rope, only utilizes a first driving wheel to make the slide regulating mechanism smoothly pass through the cableway rope joints or turns;

The transmission mechanism drives the first transmission subassembly, the second transmission subassembly and the third transmission subassembly to rotate; the rotational direction of the second transmission subassembly and the third transmission subassembly is reverse with the rotational direction of the first transmission subassembly.

The slide regulating mechanism of the present invention is installed on the pull arm; a first transmission subassembly, a second transmission subassembly and a third transmission subassembly of the slide regulating mechanism surround the cableway rope clamping area; when the cableway rope is in the cableway rope clamping area, the cableway rope is clamped with the first transmission subassembly, the second transmission subassembly and the third transmission subassembly so that the transport device can freely slide along the cableway rope; the first transmission subassembly, the second transmission subassembly and the third transmission subassembly are installed on the pull arm, so the transport device can suspended on the cableway rope in the form of a single arm and thus the transport device can slide and make turns more smoothly and increase the traveling speed of the transport device; moreover, the slide regulating mechanism is equipped with a first lifting subassembly, and that the first transmission subassembly, the second transmission subassembly and the third transmission subassembly can regulate their positions through the first lifting subassembly and thus change the clamping degree of the cableway rope clamping area so that the cableway rope clamping area can adapt to the cableway ropes of different sizes and thus improve the applicability of the transport device.

The present invention also provides the following technical solutions:

Further, the slide regulating mechanism also comprises a fourth transmission subassembly and a fifth transmission subassembly; the fourth transmission subassembly and the fifth transmission subassembly are located under the first transmission subassembly, between the first transmission subassembly and the transmission mechanism is a first transmission belt; the transmission mechanism drive the first transmission subassembly to rotate via the first transmission belt; between the first transmission subassembly and the fourth transmission subassembly is a second transmission belt, the first transmission subassembly drives the fourth transmission subassembly to rotate via the second transmission belt; between the second transmission subassembly and the third transmission subassembly is a third transmission belt, the fourth transmission subassembly drives the second transmission subassembly, the third transmission subassembly and the fifth transmission subassembly to rotate via the third transmission belt.

The transmission mechanism of the present invention drives the first transmission subassembly to rotate through the first transmission belt; the first transmission subassembly drives the fourth transmission subassembly to rotate through the second transmission belt; the fourth transmission subassembly drives the second transmission subassembly and the third transmission subassembly to rotate through the third transmission belt; the present invention is equipped with the fourth transmission subassembly and the fifth transmission subassembly, so the third transmission belt changes the rotational direction of the second transmission subassembly and the third transmission subassembly with the action of the fourth transmission subassembly and the fifth transmission subassembly to make the directional direction of the second transmission subassembly and the third transmission subassembly reverse with the rotational direction of the first transmission subassembly; the first driving subassembly is located above the cableway rope, the second driving subassembly and the third driving subassembly are located under the cableway rope so that the three driving subassemblies can simultaneously produce the driving forces of the same direction and thus make the transport devices freely move along the cableway rope.

Further, it also comprises a plurality of extension devices two adjacent transport devices are connected through one extension device; an extension device comprises a sixth transmission subassembly, a seventh transmission subassembly, an eighth transmission subassembly, a second lifting subassembly, a fifth connecting rod, a sixth connecting rod, a seventh connecting rod and an eighth connecting rod; the second lifting subassembly is movably suspended on the sixth transmission subassembly, the second lifting subassembly comprises a second sliding block which can be lifted up and down, the seventh transmission subassembly and the eighth transmission subassembly are located under the sixth transmission subassembly; the third transmission subassembly of the previous transport device and the sixth transmission subassembly of the expansion mechanism are connected through the fifth connecting rod; the third transmission subassembly of the previous transport device and the second sliding block of the expansion mechanism are connected through the sixth connecting rod; the second transmission subassembly of the next transport device and the sixth transmission subassembly of the expansion mechanism are connected through the seventh connecting rod; the second transmission subassembly and the sliding block of the expansion mechanism are connected through the eighth connecting rod; the second lifting subassembly regulates the clamping degree of the cableway rope clamping area formed by the third driving wheel of the previous transport device, the fourth driving wheel of the expansion mechanism and the second driving wheel of the next transport device.

The two adjacent transport devices of the present invention are connected through an extension device; the extension device transmits the motive power of the previous transport device to the next transport device; the user can properly adjust the number of transport devices suspended on the cableway rope as per the load carrying capacity; a plurality of transport devices share the same power source, so it is convenient for the user to operate the transport devices and thus improve the applicability of the transport devices.

Further, a forth transmission belt is installed among the seventh transmission subassembly, the eighth transmission subassembly, the third transmission subassembly of the previous transport device and the second transmission subassembly of the next transport device; the third transmission subassembly of the previous transport device drives the seventh transmission subassembly, the eight transmission subassembly and the second transmission subassembly of the next transport device to rotate via the fourth transmission belt and thus make the second transmission subassembly of the next transport device for an impetus; the second transmission subassembly successively transmits the impetus to the next transport device through the second transmission belt and the third transmission belt; in this way, between the sixth transmission subassembly and the seventh transmission subassembly is the fifth transmission belt via the fifth transmission belt; the seventh transmission subassembly drives the sixth transmission subassembly to rotate through the fifth transmission belt.

Further, the transmission mechanism comprises a frame, a ninth transmission subassembly, a tenth transmission subassembly and a transmission reversing subassembly; on one side of the frame is designed with an opening; the pull arm comprises an upper pull arm part and a lower pull arm part; the upper end of the upper pull arm part is movably suspended on the first transmission subassembly, the lower end of the upper pull arm part is rotatably connected with the upper end of the lower pull arm part, the lower end of the lower pull arm part is inserted into the opening and the end device extending the opening is with hook which is used for suspending objects or a power source; the ninth transmission subassembly is designed rotatably on one side of the frame, the ninth transmission subassembly passes through the opening and is connected with the pull arm; the pull arm rotates with the ninth transmission subassembly as the center of rotation; the opening limits the rotation angle of the pull arm; the tenth transmission subassembly is designed rotatably on the other side of the frame, the transmission reversing subassembly is rotatably designed at the center of the frame, the transmission reversing subassembly located in the frame is rotatably connected with the ninth transmission subassembly and the tenth transmission subassembly, the transmission reversing subassembly extending the frame is connected with the transmission reversing shaft of the other transport device.

The both ends of the transmission reversing subassembly of the present invention are connected respectively with the transmission mechanism of another transport device, the transmission reversing subassembly is engaged with the ninth transmission subassembly and the tenth transmission subassembly respectively; the tenth transmission subassembly transmits the motive power to the transmission reversing subassembly which transmits the motive power to the ninth transmission subassembly and another transport device respectively.

Further, the first transmission belt is installed between the ninth transmission subassembly and the first transmission subassembly; the ninth transmission subassembly drives the first transmission subassembly to rotate through the first transmission belt.

Further, it also comprises the power source, the transport is connected with the power source to form the driving transport device; the power source is suspended on the hook; between the tenth transmission subassembly and the power source is the sixth transmission belt; the power source utilizes the sixth transmission belt to respectively transmit the power to the tenth transmission subassembly, the transmission reversing subassembly and the ninth transmission subassembly; the transport device is not connected with the power source to form one passive transport device.

Further, the first lifting subassembly also comprises a first baseplate, a first guide rail, a first sliding block, a first screw and a first nut; the first baseplate is movably suspended on the first transmission subassembly; the first guide rail and the first screw are located on the first baseplate; on both sides of the first sliding block are a first pivoting shaft and a second pivoting shaft; the first sliding block is located on the first baseplate; the first guide rail and the first screw pass through the first sliding block; the first sliding block slides along the first guide rail; the first nut sleeves the first screw and slides along the first screw; the first nut rotates and slides around the first screw to drive the first sliding block to lift up and down along the first guide rail;

The fourth transmission subassembly comprises a fourth transmission shaft, a fourth front belt pulley and a fourth rear belt pulley; the fourth transmission shaft is located on the first baseplate, the fourth front belt pulley and the fourth rear belt pulley are fixed onto the fourth transmission shaft; the fifth transmission subassembly comprises a fifth transmission shaft and a fifth belt pulley, the fifth transmission shaft is located on the first baseplate, the fifth belt pulley is fixed onto the fifth transmission shaft;

The first transmission subassembly comprises the first driving wheel, the first transmission shaft, the first front belt pulley and the first rear belt pulley; the first driving wheel is axially located at the front end of the first transmission shaft, the first front belt pulley is fixed in the middle of the first transmission shaft, the first rear belt pulley is fixed at the rear end of the first transmission shaft; the second transmission subassembly comprises the second driving wheel, the second transmission shaft, the second front belt pulley and the second rear belt pulley, the second driving wheel is axially and movably located at the front end of the second transmission shaft, the second front belt pulley and the second rear belt pulley are fixed at the rear end of the second transmission shaft; the third transmission subassembly comprises the third driving wheel, the third transmission shaft, the third front belt pulley and the third rear belt pulley, the third driving wheel is axially installed at the front end of the third transmission shaft, the third front belt pulley and the third rear belt pulley are fixed at the rear end of the third transmission shaft;

The front end of the first connecting rod is connected with the first transmission shaft, the rear end of the first connecting rod is connected with the second transmission shaft; the front end of the second connecting rod is connected with the first pivoting shaft of the first sliding block, and the rear end of the second connecting rod is connected with the second transmission shaft; the front end of the third connecting rod is connected with the first transmission shaft, the rear end of the third connecting rod is connected with the third transmission shaft; the front end of the fourth connecting rod is connected with the second pivoting shaft of the first siding block and the rear end of the fourth connecting rod is connected with the third transmission shaft;

The first driving wheel, the second driving wheel and the third driving wheel form the cableway rope clamping area; the second transmission belt is a transmission belt and sleeves the first front belt pulley and the fourth front belt pulley; the third transmission belt is a transmission belt and sleeves the second front belt pulley, the third front belt pulley, the fourth rear belt pulley and the fifth belt pulley.

Further, the second lifting subassembly also comprises a second baseplate, a second guide rail, a second sliding block, a second screw and a second nut; the second baseplate is movably suspended on the sixth transmission subassembly; the second guide rail and the second screw are located on the second baseplate; on both sides of the second sliding block are a third pivoting shaft and a fourth pivoting shaft; the second sliding block is located on the second baseplate; the second guide rail and the second screw pass through the second sliding block; the second sliding block slides along the second guide rail; the second nut (715) sleeves the second screw and slides along the second screw (714); the second nut (715) rotates and slides around the second screw (714) to drive the second sliding block to lift up and down along the second guide rail;

The seventh transmission subassembly comprises a seventh transmission shaft, a seventh front belt pulley and a seventh rear belt pulley; the seventh transmission shaft is located on the second baseplate, the seventh front belt pulley and the seventh rear belt pulley are fixed onto the seventh transmission shaft; the eighth transmission subassembly comprises an eighth transmission shaft and an eighth belt pulley, the eighth transmission shaft is located on the second baseplate, the eighth belt pulley is fixed onto the eighth transmission shaft;

The sixth transmission subassembly comprises a fourth driving wheel, a sixth transmission shaft and a sixth belt pulley; the fourth driving wheel is axially installed at the front end of the sixth transmission shaft; the sixth belt pulley is fixed at the rear end of the sixth transmission shaft; the front end of the fifth connecting rod is connected with the third transmission shaft of the previous transport device, and the rear end of the fifth connecting rod is connected with the sixth transmission shaft of the expansion mechanism; the front end of the sixth connecting rod is connected with the third transmission shaft of the previous transport device, and the rear end of the sixth connecting rod is connected with the third pivoting shaft of the second sliding block of the expansion mechanism; the front end of the seventh connecting rod is connected with the second transmission shaft of the next transport device, and the rear end of the seventh connecting rod is connected with the sixth transmission shaft of the expansion mechanism; the front end of the eighth connecting rod is connected with the second transmission shaft of the next transport device and the rear end of the eighth connecting rod is connected with the fourth pivoting shaft of the second sliding block of the expansion mechanism;

The fourth transmission belt is a transmission belt and sleeves the third rear belt pulley, the seventh rear belt pulley and the eighth belt pulley of the previous transport device as well as the second rear belt pulley of the next transport device; the fifth transmission belt is a transmission belt and sleeves the sixth belt pulley and the seventh belt pulley.

Further, the first driving wheel, the second driving wheel and the third driving wheel are inflatable tyres with cableway rope clamping grooves or rubber tyres with cableway rope clamping grooves; two ends of each inflatable or rubber tyre are equipped with metal protecting covers which are used to prevent the running cableway rope from separating from the inflatable or rubber tyre; the pressurized deformation of the inflatable or rubber tyre ensures sufficient contact area between the cableway rope and the inflatable or rubber tyre.

In the present invention, the first driving wheel, the second driving wheel and the third driving wheel are equipped with inflatable tyres to increase the contact area of the cableway rope with the inflatable tyres through the pressurized deformation of the clamping grooves and the inflatable tyres and thus increase the friction of the first driving wheel, the second driving wheel and the third driving wheel with the cableway rope; the user can adjust the inflation extent of the inflatable tyres to adjust the friction of the first driving wheel, the second driving wheel and the third driving wheel with the cableway rope, ensure no slippage between the transport devices and the cableway rope and thus improve the applicability of the cableway self-propelled transport facility.

Further, the pull arm comprises an upper pull arm part and a lower pull arm part; the upper pull arm part comprises a beam, a first shaft sleeve and a second shaft sleeve; the first shaft sleeve and the second shaft sleeve are fixed under both sides of the beam respectively; the middle of the lower pull arm part is designed with a shaft hole, the lower end of the lower pull arm part is designed with a hook which is used for suspending objects or a power source, the upper pull arm part and the lower pull arm part are rotatably connected together. The slide regulating mechanism is movably installed onto the upper pull arm part and the transmission mechanism is movably installed onto the lower pull arm part.

The present invention has the beneficial effects that:

The slide regulating mechanism of the present invention is installed on the pull arm; a first transmission subassembly, a second transmission subassembly and a third transmission subassembly of the slide regulating mechanism surround the cableway rope clamping area; when the cableway rope is in the cableway rope clamping area, the cableway rope is clamped with the first transmission subassembly, the second transmission subassembly and the third transmission subassembly so that the transport device can freely slide along the cableway rope; the first transmission subassembly, the second transmission subassembly and the third transmission subassembly are installed on the pull arm, so the transport device can suspended on the cableway rope in the form of a single arm and thus the transport device can slide and make turns more smoothly and increase the traveling speed of the transport device; moreover, the slide regulating mechanism is equipped with a first lifting subassembly, and that the first transmission subassembly, the second transmission subassembly and the third transmission subassembly can regulate their positions through the first lifting subassembly and thus change the clamping degree of the cableway rope clamping area so that the cableway rope clamping area can adapt to the cableway ropes of different sizes and thus improve the applicability of the transport device; when the transport facility passes through the joints or turns of the cableway rope, it can manually or automatically descend the second transmission subassembly and the third transmission subassembly to make them temporarily separate from the cableway rope, only utilize the first transmission subassembly to smoothly pass through the joints of the cableway rope or make turns; after passing through the joints or turns, it can manually or automatically ascend the second transmission subassembly and the third transmission subassembly to regain their driving force.

The two adjacent transport devices of the present invention are connected through an extension device; the extension device transmits the motive power of the previous transport device to the next transport device; the user can properly adjust the number of transport devices suspended on the cableway rope as per the load carrying capacity; a plurality of transport devices share the same power source, so it is convenient for the user to operate the transport devices and thus improve the applicability of the transport devices.

The both ends of the transmission reversing subassembly of the present invention are connected respectively with the transmission mechanism of another transport device, the transmission reversing subassembly is engaged with the ninth transmission subassembly and the tenth transmission subassembly respectively; the tenth transmission subassembly transmits the motive power to the transmission reversing subassembly which transmits the motive power to the ninth transmission subassembly and another transport device respectively.

In the present invention, the first driving wheel, the second driving wheel and the third driving wheel are equipped with inflatable tyres to increase the friction of the first driving wheel, the second driving wheel and the third driving wheel with the cableway rope; the user can adjust the inflation extent of the inflatable tyres to adjust the friction of the first driving wheel, the second driving wheel and the third driving wheel with the cableway rope, ensure no slippage between the transport devices and the cableway rope and thus improve the applicability of the cableway self-propelled transport facility.

DETAILED DESCRIPTION OF THE INVENTION

The present invention will be described more clearly and fully in conjunction with the accompanying drawings and embodiments:

With regard to Embodiment 1, as shown from FIG. 1 to FIG. 4, a cableway self-propelled transport facility comprises a transport device (1), wherein the transport device (1) comprises a slide regulating mechanism (2), a transmission mechanism (3) and a pull arm (4).

Figure 15:
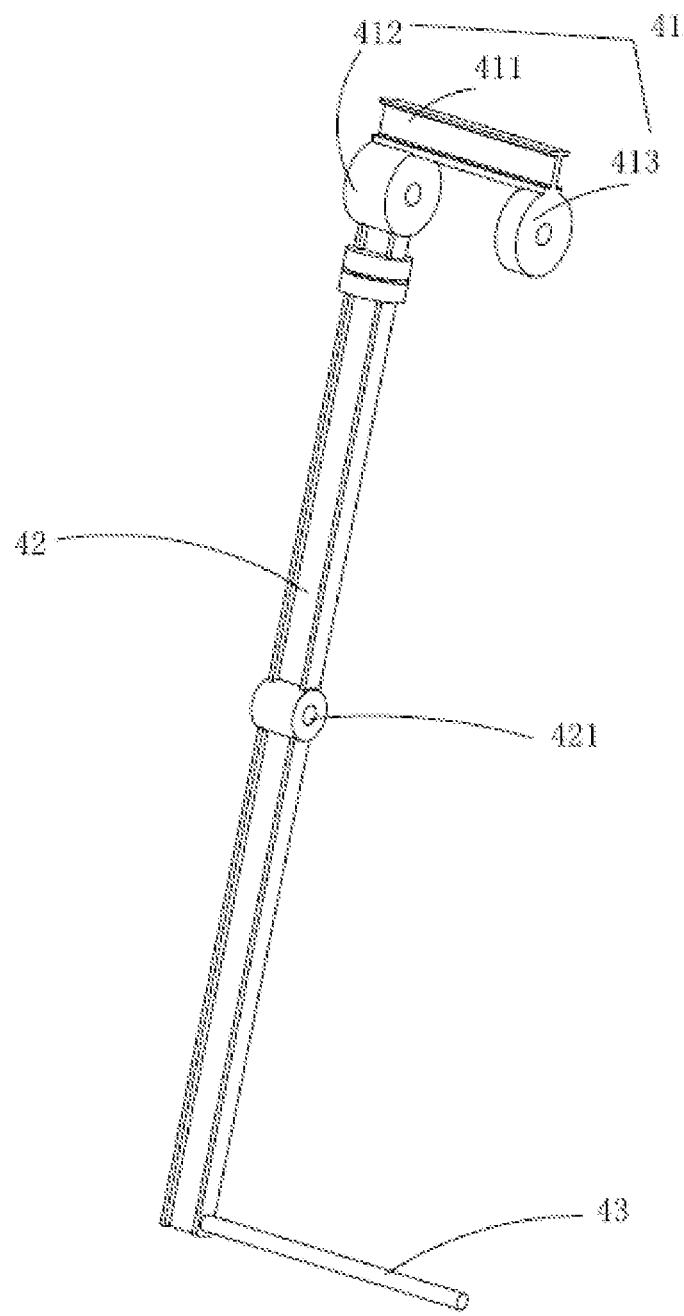
FIG. 15 is a schematic diagram of the pull arm of the cableway self-propelled transport facility.

As shown in FIG. 15, the pull arm (4) comprises an upper pull arm part (41) and a lower pull arm part (42); wherein the upper pull arm part (41) comprises a beam (411), a first shaft sleeve (412) and a second shaft sleeve (413); the first shaft sleeve (412) and the second shaft sleeve (413) are fixed under both sides of the beam (411) respectively; the middle of the lower pull arm part (42) is designed with a shaft hole (421), the lower end of the lower pull arm part (42) is designed with a hook (43) which is used for suspending objects or a power source (5), the upper pull arm part (41) and the lower pull arm part (42) are rotatably connected together. The slide regulating mechanism (2) is movably installed onto the upper pull arm part (41) and the transmission mechanism (3) is movably installed onto the lower pull arm part (42).

The slide regulating mechanism (2) comprises a first lifting subassembly (20), a first transmission subassembly (21), a second transmission subassembly (22), a third transmission subassembly (23), a fourth transmission subassembly (24), a fifth transmission subassembly (25), a first connecting rod (26), a second connecting rod (27), a third connecting rod (28) and a fourth connecting rod (29).

Figure 14:
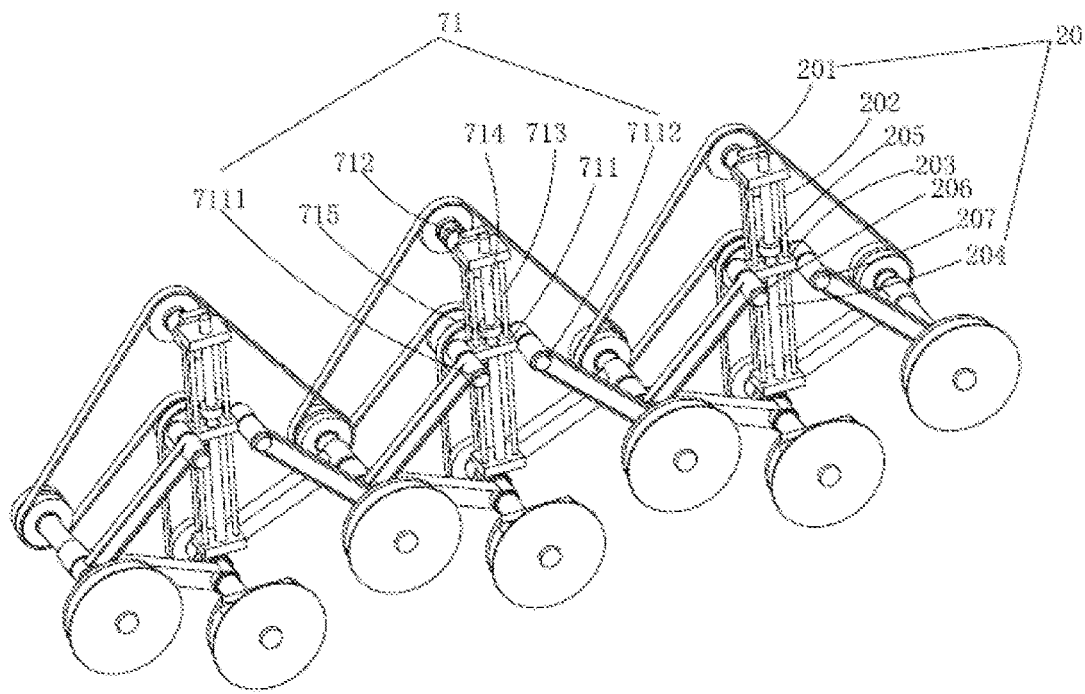
FIG. 14 is a schematic diagram of another angle of combining the slide regulating mechanism and the expansion mechanism of the cableway self-propelled transport facility in Embodiment 4.

As shown in FIG. 14, the first lifting subassembly (20) also comprises a first baseplate (201), a first guide rail (202), a first sliding block (203), a first screw (204) and a first nut (205); the first baseplate (201) is movably suspended on the first transmission subassembly (21); the first guide rail (202) and the first screw (204) are located on the first baseplate (201); on both sides of the first sliding block (203) are a first pivoting shaft (206) and a second pivoting shaft (207) respectively; the first sliding block (203) is located on the first baseplate (201); the first guide rail (202) and the first screw (204) pass through the first sliding block (203); the first sliding block (203) slides along the first guide rail (202); the first nut (205) sleeves the first screw (714) and slides along the first screw (714); the first nut (205) rotates and slides around the first screw (204) to drive the first sliding block (203) to lift up and down along the first guide rail (202).

The first transmission subassembly (21) comprises a first transmission shaft (211), a first driving wheel (212), a first front belt pulley (213) and a first rear belt pulley (214), wherein the first transmission shaft (211) flexibly passes through the first shaft sleeve (412) and the second shaft sleeve (413) of the upper pull arm part (41) to realize flexible connection of the first transmission shaft (211) with the upper pull arm part (41); the first driving wheel (212) is axially and slidably installed at the front end of the first transmission shaft (211), and the first front belt pulley (211) is fixed in the middle of the first transmission shaft (211) and the first rear belt pulley (214) is fixed at the rear end of the first transmission shaft (211). The second transmission subassembly (22) comprises a second transmission shaft (221), a second driving wheel (222), a second front belt pulley (223) and a second rear belt pulley (224), wherein the second driving wheel (222) is axially and slidably installed at the front end of the second transmission shaft (221), and the second front belt pulley (223) and the second rear belt pulley (224) are fixed at the rear end of the second transmission shaft (221). The third transmission subassembly (23) comprises a third transmission shaft (231), a third driving wheel (232), a third front belt pulley (233) and a third rear belt pulley (234), wherein the third driving wheel (232) is axially and slidably installed at the front end of the third transmission shaft (231), and the third front belt pulley (233) and the third rear belt pulley (234) are fixed at the rear end of the third transmission shaft (231). The fourth transmission subassembly (24) comprises a fourth transmission shaft (241), a fourth front belt pulley (242) and a fourth rear belt pulley (243), wherein the fourth front belt pulley (242) and the fourth rear belt pulley (243) are fixed onto the fourth transmission shaft (241). The fifth transmission subassembly (25) comprises a fifth transmission shaft (251) and a fifth belt pulley (252), wherein the fifth belt pulley (252) is fixed onto the fifth transmission shaft (251).

The first baseplate (201) is suspended on the first transmission shaft (211), the fourth transmission subassembly (24) and the fifth transmission subassembly (25) are rotatably installed on the first baseplate (201).

the second transmission subassembly (22) is located on the left side of the first transmission subassembly (21), the third transmission subassembly (23) is located on the right side of the first transmission subassembly (21); the front end of the first connecting rod (26) is connected with the first transmission shaft (211) and the rear end of the first connecting rod (26) is connected with the second transmission shaft (221) to realize the connection of the second transmission subassembly (22) with the first transmission subassembly (21); the front end of the second connecting rod (27) is connected with the first pivoting shaft (206) of the first sliding block (203) and the rear end of the second connecting rod (27) is connected with the second transmission shaft (221) to realize the connection of the second transmission subassembly (22) with the first lifting subassembly (20); the front end of the third connecting rod (28) is connected with the first transmission shaft (211) and the rear end of the third connecting rod (28) is connected with the third transmission shaft (231) to realize the connection of the third transmission subassembly (23) with the first lifting subassembly (21); the front end of the fourth connecting rod (29) is connected with the second pivoting shaft (207) of the first siding block (203) and the rear end of the fourth connecting rod (29) is connected with the third transmission shaft (20) to realize the connection of the third transmission subassembly (23) with the first lifting subassembly (20) and thus form the clamping degree regulating mechanism of the first cableway rope.

Figure 16:
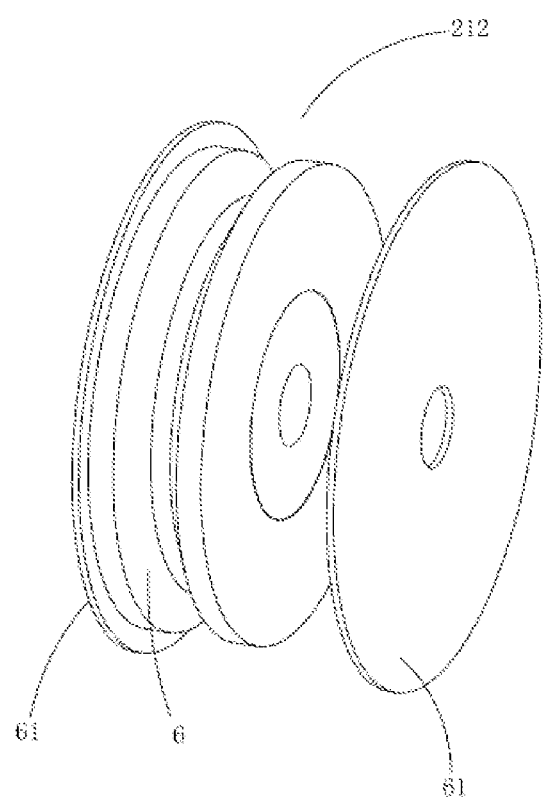
FIG. 16 is a schematic diagram of a driving wheel of the cableway self-propelled transport facility.

As shown in FIG. 16, the first driving wheel (212), the second driving wheel (222) and the third driving wheel (232) are inflatable tyres with cableway rope clamping grooves (6) or rubber tyres with cableway rope clamping grooves (6); two ends of each inflatable or rubber tyre are equipped with metal protecting covers (61) which are used to prevent the running cableway rope from separating from the inflatable or rubber tyre; the pressurized deformation of the inflatable or rubber tyre ensures sufficient contact area between the cableway rope and the inflatable or rubber tyre.

Between the first front belt pulley (213) and the fourth front belt pulley (242) is the second transmission belt (12); the second transmission belt (12) is a transmission belt and sleeves the first front belt pulley (213) and the fourth front belt pulley (242) to realize synchronous rotation of the first transmission subassembly (21) and the fourth transmission subassembly (24).

Among the second rear belt pulley (223), the fourth rear belt pulley (243), the fifth belt pulley (252) and the third rear belt pulley (233) is the third transmission belt (13); the third transmission belt (13) is a transmission belt and sleeves the second rear belt pulley (233), the fourth rear belt pulley (243), the fifth belt pulley (252) and the third rear belt pulley (233) to realize synchronous rotation of the second transmission subassembly (22), the third transmission subassembly (23) and the fifth transmission subassembly (25) driven by the fourth transmission subassembly (24).

The second transmission subassembly (22) is located on the left side of the first transmission subassembly (21), the third transmission subassembly (23) is located on the right side of the first transmission subassembly (21), the fourth transmission subassembly (24) and the fifth transmission subassembly (25) are located under the first transmission subassembly (21); the first transmission subassembly (21) and the fourth transmission subassembly (24) transmit through the second transmission belt (12), the first transmission subassembly (21) and the fourth transmission subassembly (24) rotate in the same direction; the second transmission subassembly (22) and the third transmission subassembly (23) adjust the rotational directional through the third transmission belt (13), the fourth transmission subassembly (24) and the fifth transmission subassembly (25); as a result, the rotational direction of the second transmission subassembly (22) and the third transmission subassembly (23) is different from the rotational direction of the first transmission subassembly (21).

The transmission mechanism (3) comprises a frame (31), a ninth transmission subassembly (32), a tenth transmission subassembly (33) and a transmission reversing subassembly (34); the frame (31) is a hollow frame (31); on one side of the frame (31) is designed with an opening (311); the lower pull arm part (42) is inserted into the opening (311); the ninth transmission subassembly (32) is rotatably installed on one side of the frame (31); the ninth transmission subassembly (32) comprises a ninth transmission shaft (321), a ninth belt pulley (322) and a first transmission gear (323), wherein the ninth transmission shaft (321) passes through the opening (311) and extends downward into the shaft hole (421) of the lower pull arm part (42) to realize flexible connection of the ninth transmission shaft (321) with the lower pull arm part (42), the front end of the ninth transmission shaft (321) extends into the frame (31) to connect the first transmission gear (323), the rear end of the ninth transmission shaft (321) extends the frame (31) to connect the ninth belt pulley (322); the pull arm (4) rotates with the ninth transmission shaft (321) as the center of rotation while the opening (311) limits the rotation angle of the pull arm (4).

The tenth transmission subassembly (33) is rotatably installed on the other side of the frame (31); the tenth transmission subassembly (33) comprises a tenth transmission shaft (331), a tenth belt pulley (332) and a second transmission gear (333); the tenth transmission shaft (331) passes through the frame (31); the front end of the tenth transmission shaft (331) extends into the frame (31) to connect the second transmission gear (333) and the rear end of the tenth transmission shaft (331) extends the frame to connect the tenth belt pulley (332); the transmission reversing subassembly (34) is rotatably installed on the frame (31); the transmission reversing subassembly (34) comprises a transmission reversing shaft (341), a transmission reversing gear (342) and a cardan joint (343), wherein the transmission reversing shaft (341) passes through the frame (31), the transmission reversing gear (342) is fixed onto the transmission reversing shaft (341) in the frame (31), the transmission reversing gear (342) is engaged with the first transmission gear (323) and the second transmission gear (333); both ends of the transmission reversing shaft (341) extend the frame (31) to connect one end of the cardan joint (343), wherein the other end of the cardan joint (343) is connected with the transmission reversing shaft (341) of another transport device (1).

The transport device (5) hooks a power source (5) (internal combustion engine or motor); between the power source (5) and the tenth transmission subassembly (33) is a sixth transmission belt (16); the sixth transmission belt (16) is a transmission belt or chain and sleeves the tenth belt pulley (332) and the power source (5); the power source (5) transmits the motive power through the sixth transmission belt (16) to the tenth transmission subassembly (33). The tenth transmission subassembly (33) transmits the motive power through the transmission reversing subassembly (34) to the ninth transmission subassembly (32) and the next transport device (1). Between the ninth transmission subassembly (32) and the first transmission subassembly (21) is a first transmission belt (11); the first transmission belt (11) is a transmission belt and sleeves the ninth belt pulley (322) and the first rear belt pulley (214); the ninth transmission subassembly (32) drives the first transmission subassembly (21) to rotate through the first transmission belt (11).

The first lifting subassembly (50) of the cableway self-propelled transport facility also can be regulated manually or through intelligent equipment.

Working Principle

The transport device (1) is suspended on the cableway rope, wherein the cableway rope is located in the clamping grooves (6) of the first driving wheel (212), the second driving wheel (222) and the third driving wheel (232) so that the cableway rope can be clamped firmly in the cableway rope clamping area of the transport devices (1). After the power source (5) is started, the power source (5) drives the tenth transmission subassembly (33) to rotate through the sixth transmission belt (16); the tenth transmission subassembly (33) transmits the motive power through the transmission reversing subassembly (34) to the ninth transmission subassembly (32).

The ninth transmission subassembly (32) drives the first transmission subassembly (21) to rotate through the first transmission belt (11) and thus makes the first driving wheel (212) rotate; the first transmission subassembly (21) drives the fourth transmission subassembly (24) to rotate through the second transmission belt (12); the fourth transmission subassembly (24) drives the fifth transmission subassembly (25), the second transmission subassembly (22) and third transmission subassembly (23) to rotate through the third transmission belt (13) and thus makes the second driving wheel (222) of the second transmission subassembly (22) and the third driving wheel (232) of the third transmission subassembly (23) rotate; the rotational direction of the second driving wheels (222) and the third driving wheel (232) is different from the rotational direction of the first driving wheel (212).

The second driving wheel (222) and the third driving wheel (232) are located under the cableway rope and rotate in the direction different from the rotational direction of the first driving wheel (212) located above the cableway rope; such design makes the cableway rope clamping area form the acting forces of identical direction and thus makes the transport devices (1) move along the cableway rope.

It is usually necessary to adjust the direction and angle of the cableway rope in order to make the cableway self-propelled transport facility adapt to different terrains, and as a result, the cableway rope will take on the following four circumstances: cableway rope between two cableway rope supports of identical height; skew cableway rope between two cableway rope supports of different heights; cable rope making turns at cableway supports; cableway rope making extreme turns at cableway supports.

Figure 1:
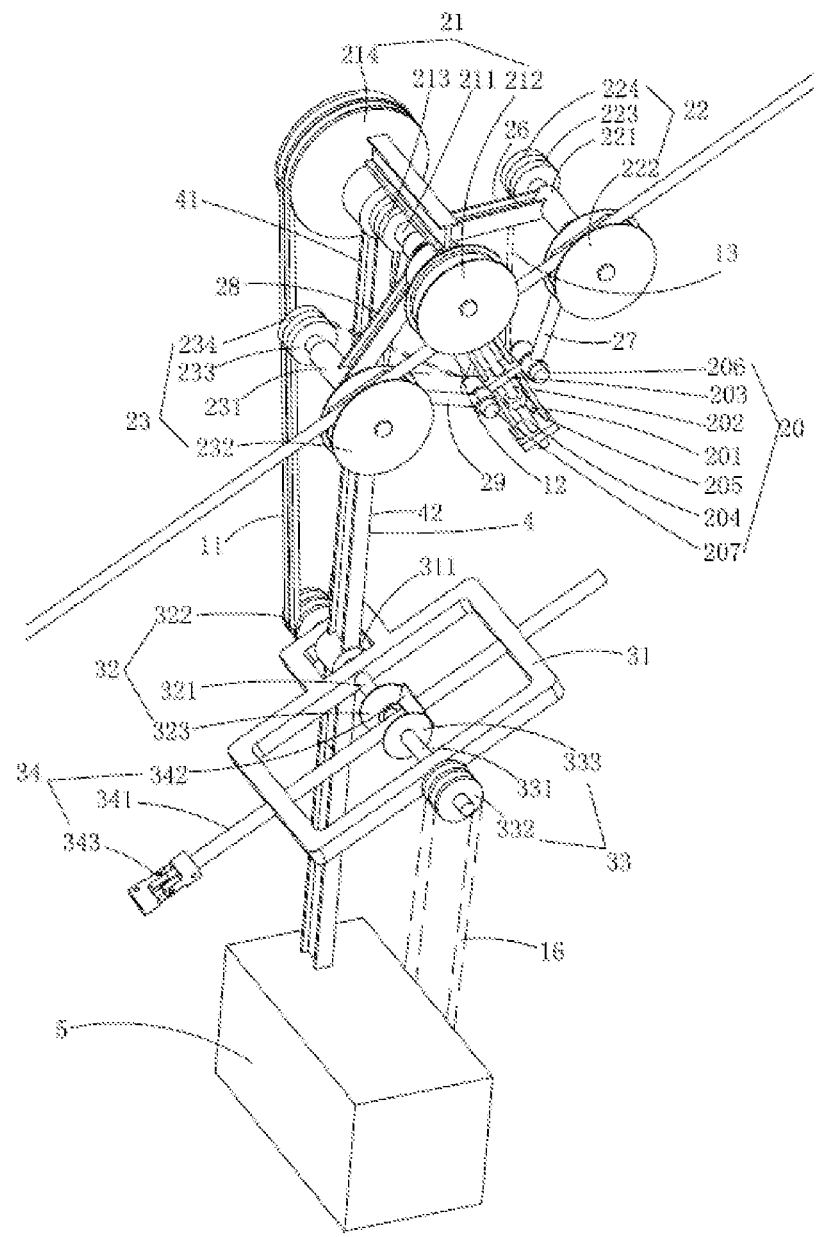
FIG. 1 is a schematic diagram of the cableway self-propelled transport facility in Embodiment 1 (a single transport device).
Figure 2:
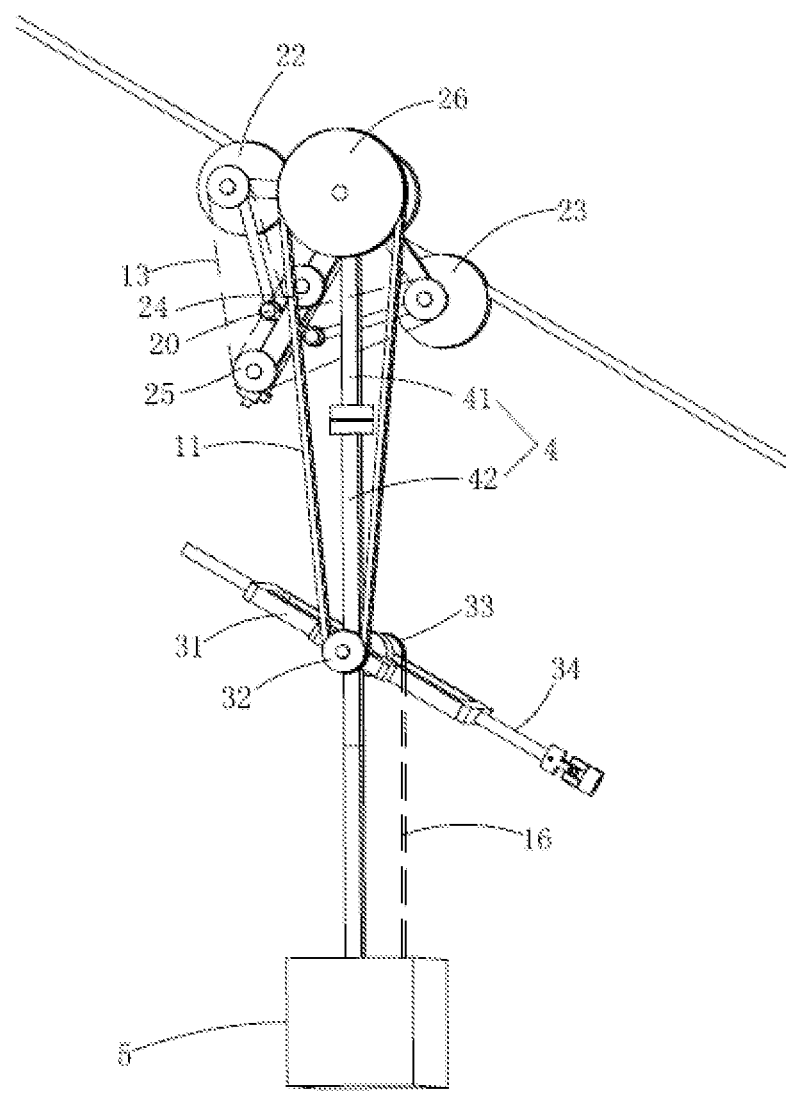
FIG. 2 is a schematic diagram of another angle in Embodiment 1.
Figure 3:
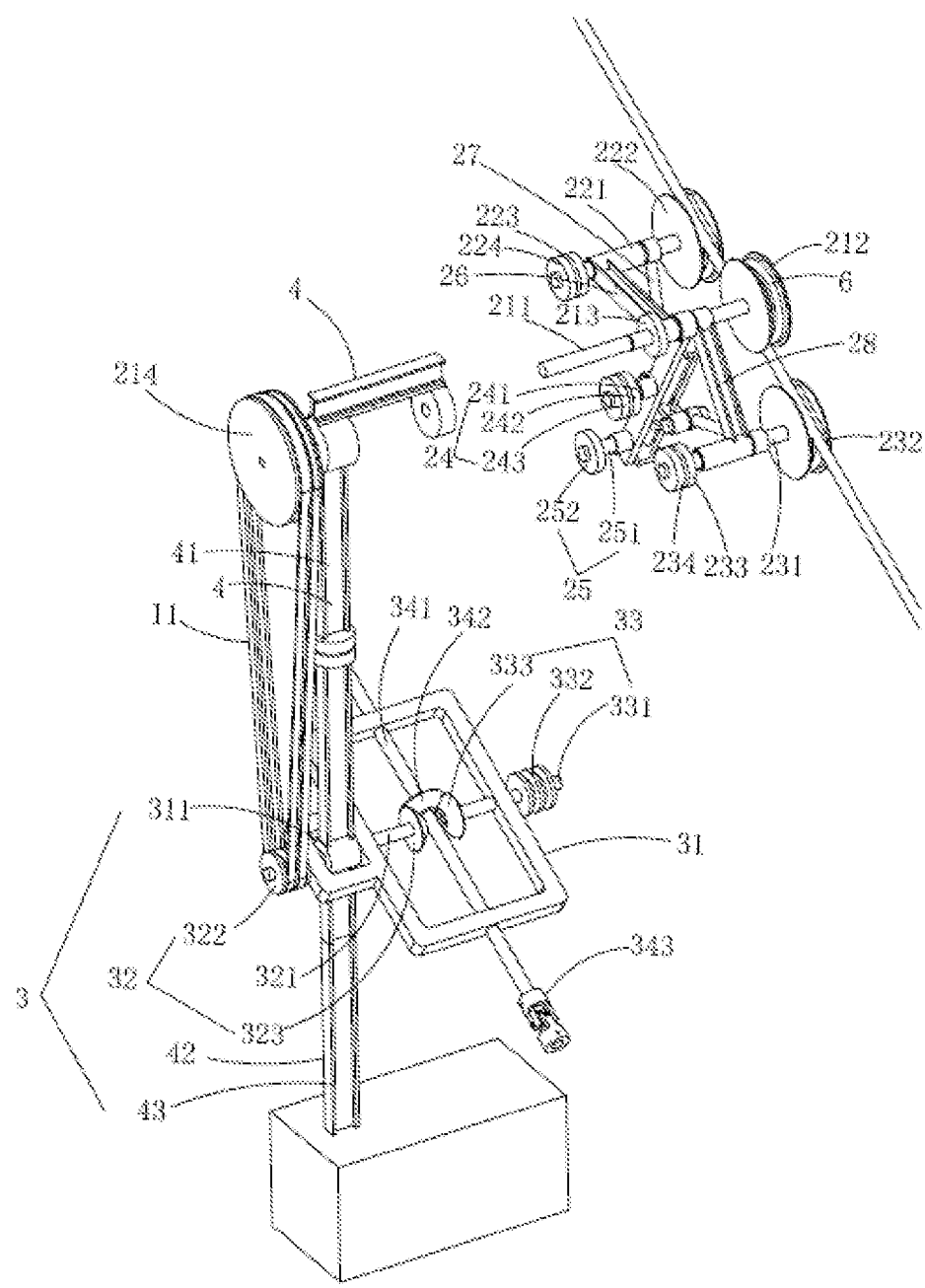
FIG. 3 is a schematic diagram of partial separation of the cableway self-propelled transport facility in Embodiment 1.
Figure 4:
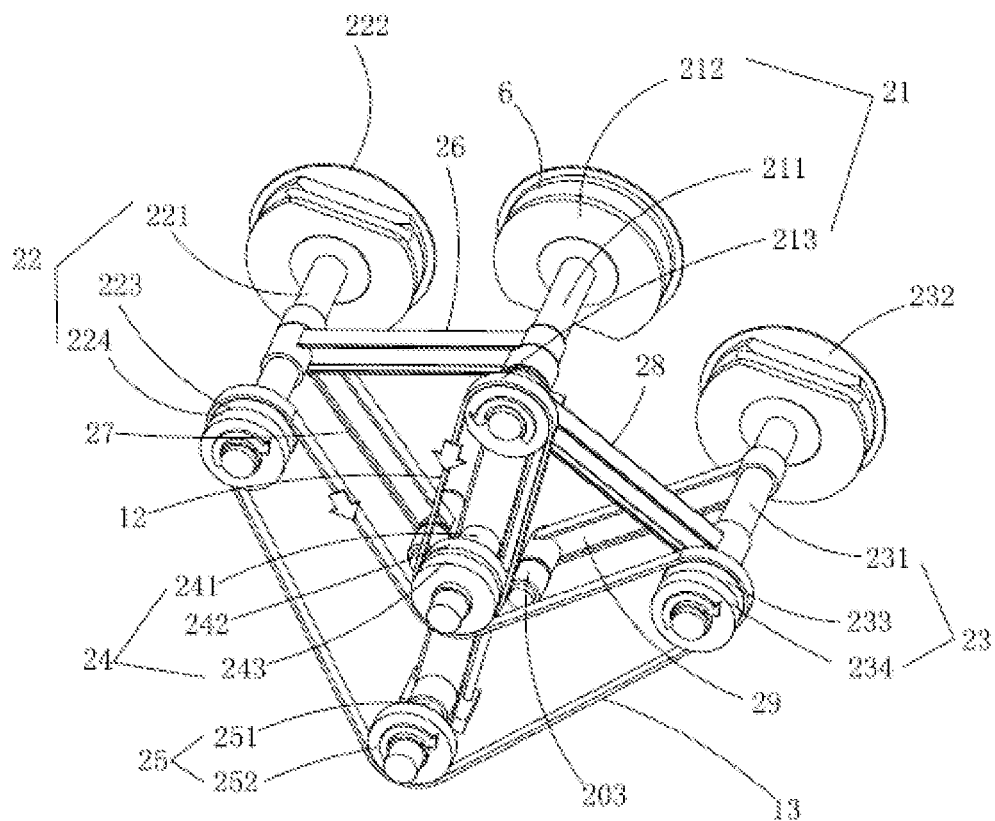
FIG. 4 is a schematic diagram of the slide regulating mechanism of the cableway self-propelled transport facility in Embodiment 1.
Figure 5:
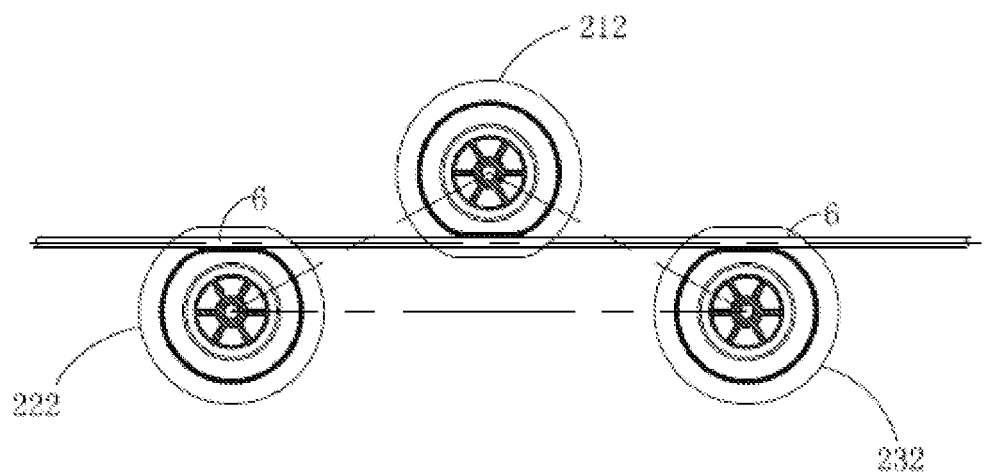
FIG. 5 is a schematic diagram of the cableway self-propelled transport facility when linearly sliding along the cableway rope.

Cableway rope between two cableway rope supports of identical height: as shown in FIG. 5, the cableway rope naturally hangs and is always located in the clamping grooves of the first driving wheel (212), the second driving wheel (222) and the third driving wheel (232) in the process of service so that the cableway rope can be clamped firmly in the cableway rope clamping area of the transport devices (1) so that the cableway self-propelled transport facility can take on more secure and smooth service.

Skew cableway rope between two cableway rope supports of different heights: the cableway rope is skew; in the process of service, its pull arm and slide regulating mechanism (2) are in flexible connection; with the action of gravity of the power source or goods underneath, the pull arm is always perpendicular to the ground and not limited by the angle of inclination of the cableway rope and the slide regulating mechanism; the cableway rope is always located in the clamping grooves of the first driving wheel (212), the second driving wheel (222) and the third driving wheel (232) in the process of service so that the cableway rope can be clamped firmly in the cableway rope clamping area of the transport devices (1) so that the cableway self-propelled transport facility can take on more secure and smooth service.

Figure 6:
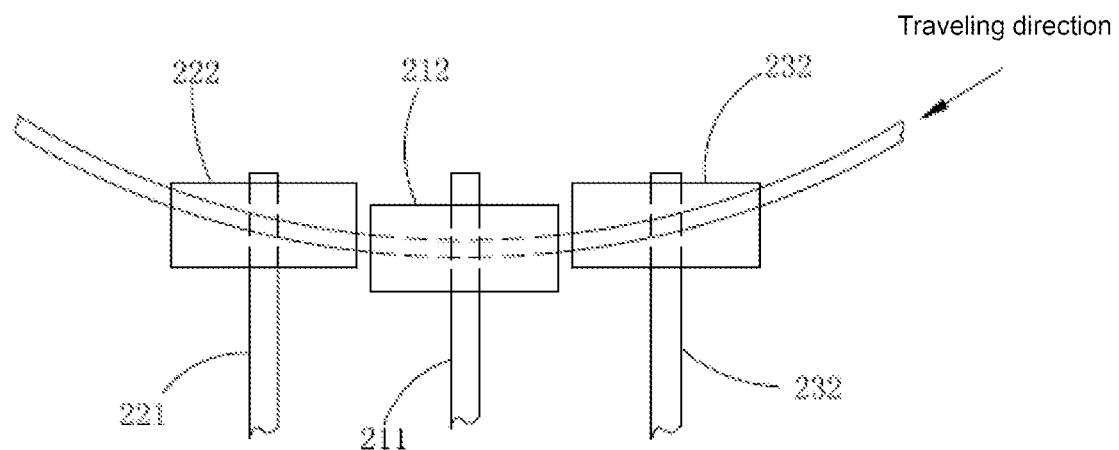
FIG. 6 is a schematic diagram of the cableway self-propelled transport facility when turning right and sliding at a cableway support.
Figure 7:
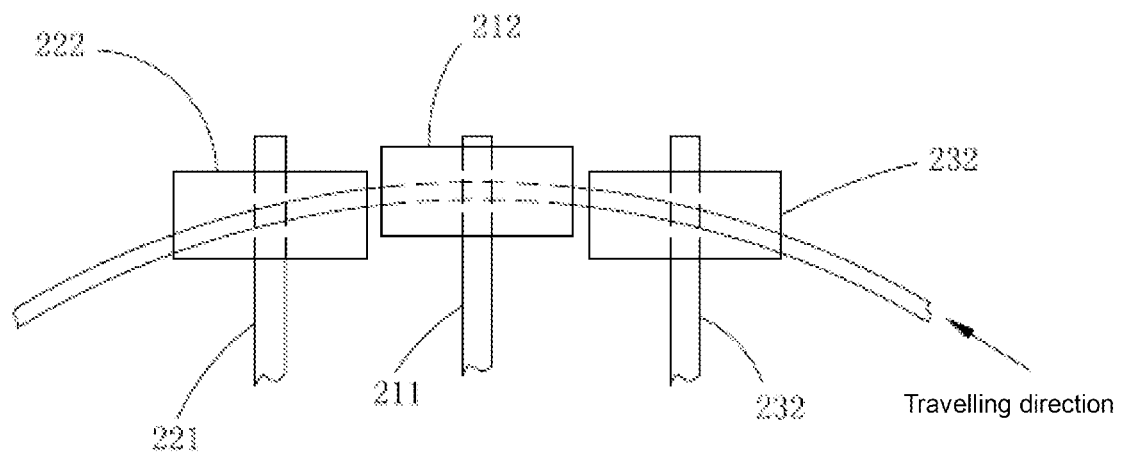
FIG. 7 is a schematic diagram of the cableway self-propelled transport facility when turning left and sliding at a cableway support.

Cableway rope making turns at cableway supports: as shown in FIG. 6 and FIG. 7, the turns or joints take on big arcs; in the process of service, the first driving wheel (212) axially slides to adjust its position, the second driving wheel (222) axially slides along the second transmission shaft (221) to adjust its position, and the third driving wheel (232) axially slides along the third transmission shaft (231) to adjust its position so that the cableway self-propelled transport facility can take on more secure and smooth service.

Figure 8:
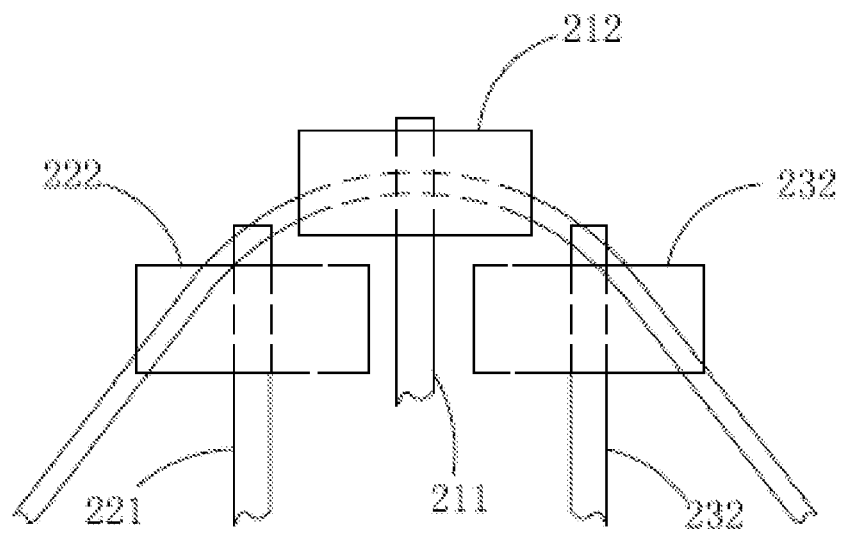
FIG. 8 is a schematic diagram of the cableway self-propelled transport facility when lifting down the second transmission subassembly and the third transmission subassembly when making an extreme turn at a cableway support.

Cableway rope making extreme turns at cableway supports: as shown in FIG. 8, the turns take on small arcs, the operator adjusts the first lifting subassembly (20) manually or through intelligent equipment to make the second driving wheel (222) and the third driving wheel (232) descend and separate from the cableway rope thus make the cableway rope only located in the clamping groove of the first driving wheel (212) and convenient for the cableway self-propelled transport facility to make turns and take on more secure and smooth service.

Figure 9:
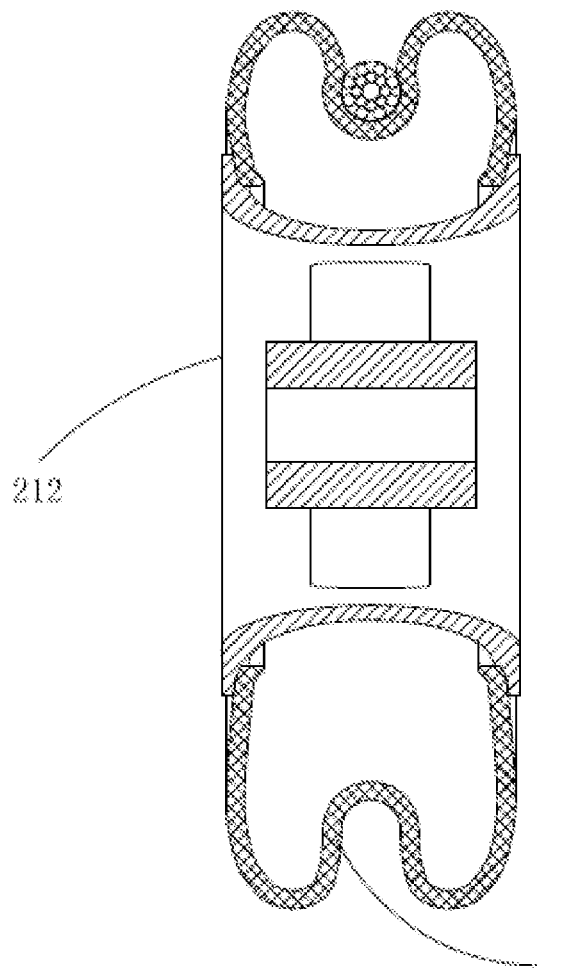
FIG. 9 is a schematic diagram of an inflatable tyre with a cableway rope clamping groove of the cableway self-propelled transport facility.

Moreover, as shown in FIG. 9, the first driving wheel (212), the second driving wheel (222) and the third driving wheel (232) are inflatable tyres with cableway rope clamping grooves (6); the inner walls of the clamping grooves (6) are elastic and enable the clamping grooves to tightly wrap the cableway rope, increase the friction, prevent the cableway rope from deviating and thus improve the service safety of the cableway self-propelled transport facility.

Figure 10:
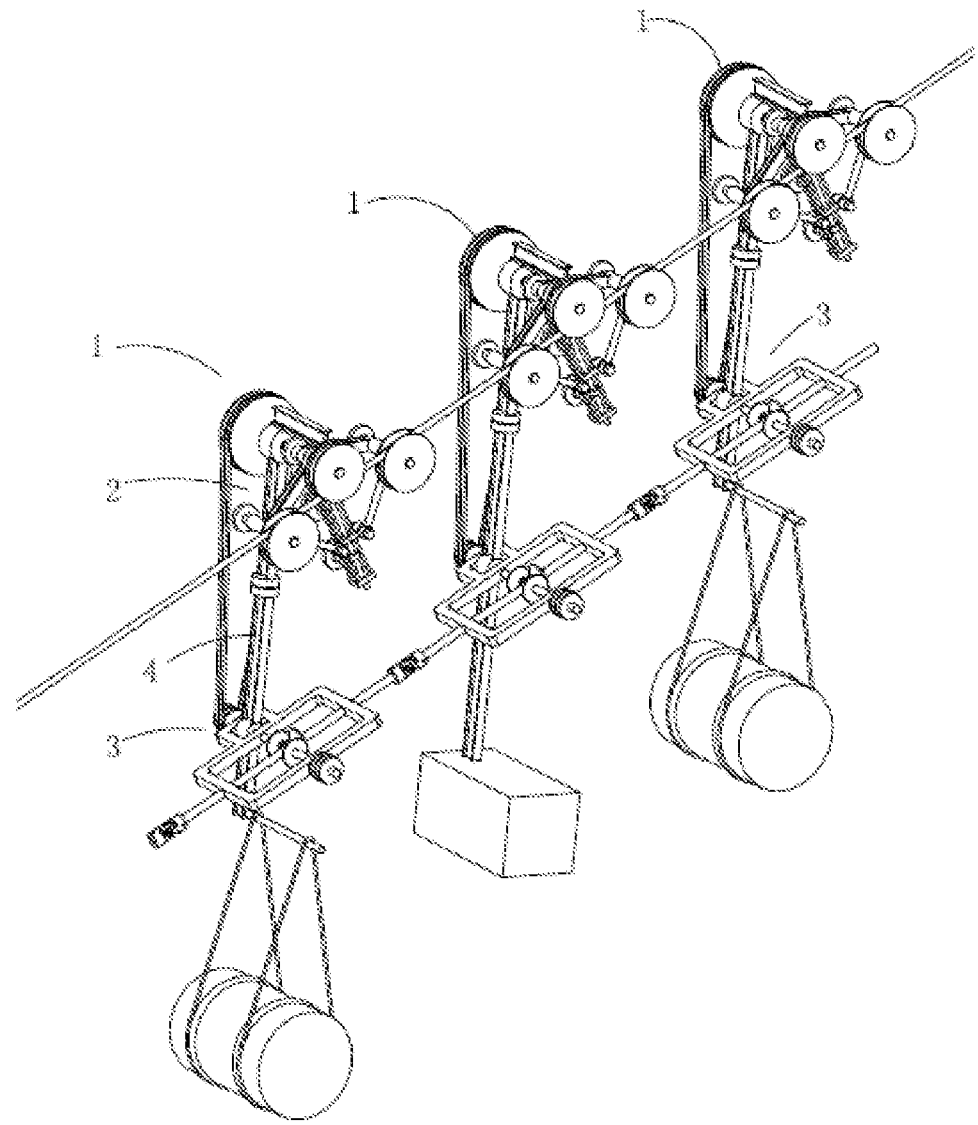
FIG. 10 is a schematic diagram of the cableway self-propelled transport facility in Embodiment 2 (a combination of multiple transport devices).

In combination with FIG. 10, the difference between Embodiment 2 and Embodiment 1: the cableway rope hangs a plurality of transport devices (1), wherein the transport device (1) hooking a power source (5) is the active transport device (1) and the transport device (1) hooking goods is the passive transport device (1); therefore, the cableway rope hangs a plurality of transport devices (1) which are connected through cardan joints (343); one end of a cardan joint (343) is connected with the transmission reversing shaft (341) of the previous transport device (1) and the other end of the cardan joint (341) is connected with the transmission reversing shaft (341) of the next transport device (1).

In Embodiment 2, the power source (5) of the active transport device (1) drives the tenth transmission subassembly (33) to rotate through the sixth transmission belt (16), wherein the tenth transmission subassembly (33) transmits the motive power through the transmission reversing subassembly (34) along the following two routes.

Route I: The tenth transmission subassembly (33) transmits the motive power through the transmission reversing subassembly (34) to the ninth transmission subassembly (32); and then, the ninth transmission subassembly (32) drives the first transmission subassembly (21) to rotate through the first transmission belt (11) and thus makes the first driving wheel (212) rotate; the first transmission subassembly (21) drives the fourth transmission subassembly (24) to rotate through the second transmission belt (12); the fourth transmission subassembly (24) drives the fifth transmission subassembly (25), the second transmission subassembly (22) and third transmission subassembly (23) to rotate through the third transmission belt (13) and thus makes the second driving wheel (222) of the second transmission subassembly (22) and the third driving wheel (232) of the third transmission subassembly (23) rotate; the rotational direction of the second driving wheels (222) and the third driving wheel (232) is different from the rotational direction of the first driving wheel (212). The second driving wheel (222) and the third driving wheel (232) are located under the cableway rope and rotate in the direction different from the rotational direction of the first driving wheel (212) located above the cableway rope; such design makes the cableway rope clamping area form the acting forces of identical direction and thus makes the transport devices (1) move along the cableway rope.

Route II: The tenth transmission subassembly (33) transmits the motive power to the transmission reversing shaft (341); and then, the transmission reversing shaft (341) transmits the motive power through the cardan joint (343) to the transmission reversing shaft (341) of another transport device (1); and then, the transmission reversing shaft (341) transmits the motive power to the ninth transmission subassembly (32); and then, the ninth transmission subassembly (32) drives the first transmission subassembly (21) to rotate through the first transmission belt (11) and thus makes the first driving wheel (212) rotate; the first transmission subassembly (21) drives the fourth transmission subassembly (24) to rotate through the second transmission belt (12); the fourth transmission subassembly (24) drives the fifth transmission subassembly (25), the second transmission subassembly (22) and third transmission subassembly (23) to rotate through the third transmission belt (13) and thus makes the second driving wheel (222) of the second transmission subassembly (22) and the third driving wheel (232) of the third transmission subassembly (23) rotate; the rotational direction of the second driving wheels (222) and the third driving wheel (232) is different from the rotational direction of the first driving wheel (212). The second driving wheel (222) and the third driving wheel (232) are located under the cableway rope and rotate in the direction different from the rotational direction of the first driving wheel (212) located above the cableway rope; such design makes the cableway rope clamping area form the acting forces of identical direction and thus makes the transport devices (1) move along the cableway rope. In this way, the motive power is simultaneously transmitted in cycles forward and backward to the next transport device (1) and thus realize synchronous operation of a plurality of transport devices (1).

Figure 11:
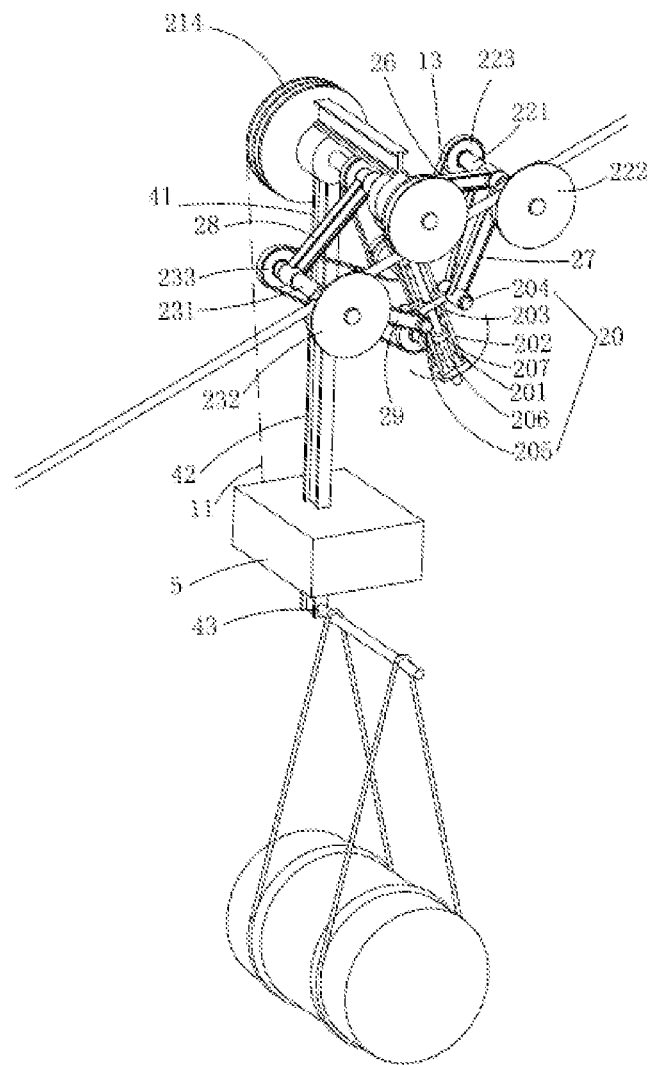
FIG. 11 is a schematic diagram of the cableway self-propelled transport facility in Embodiment 3 (a single transport device).

In combination with FIG. 11, the difference between Embodiment 3 and Embodiment 1: The transmission mechanism of Embodiment 3 is equipped with a power source (5) only, wherein the power source (5) is suspended under the pull arm, between the power source (5) and the first transmission subassembly (21) of the transport device (1) is a first transmission belt (11); the first transmission belt (11) is a transmission belt and the transmission mechanism (3) drives the first transmission subassembly (21) to rotate through the first transmission belt (11).

Figure 12:
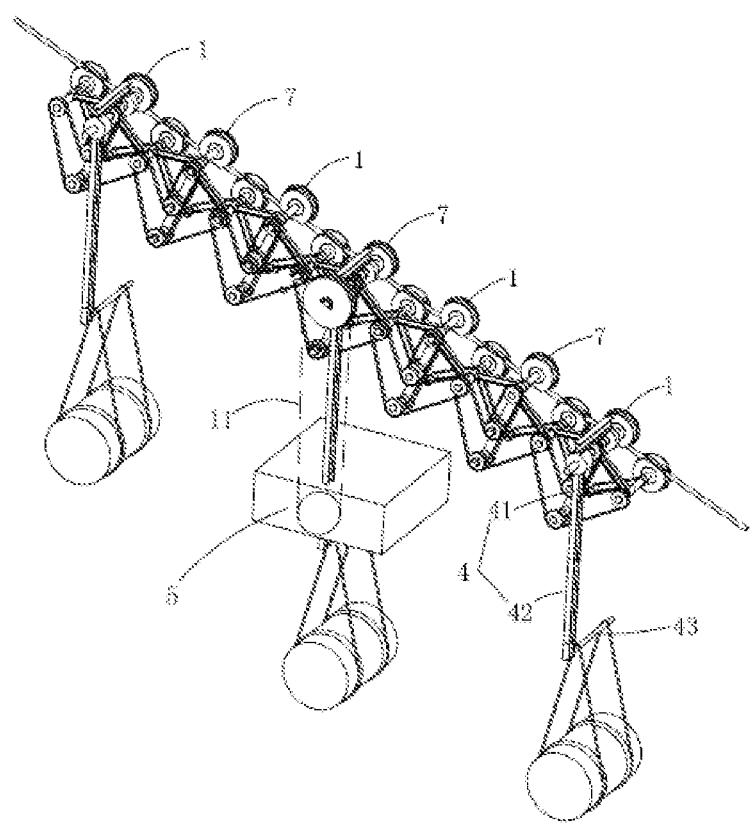
FIG. 12 is a schematic diagram of the cableway self-propelled transport facility in Embodiment 4 (an expansion combination).
Figure 13:
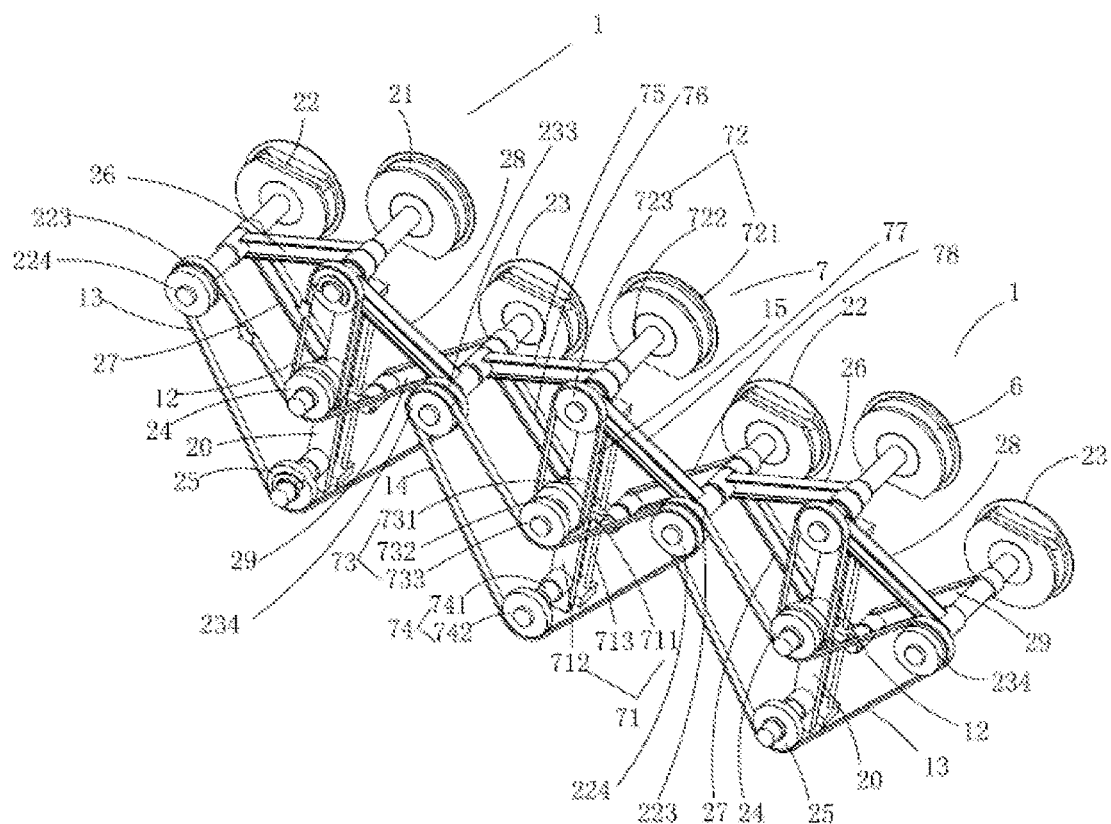
FIG. 13 is a schematic diagram of combining the slide regulating mechanism and the expansion mechanism of the cableway self-propelled transport facility in Embodiment 4.

In combination with FIG. 12 and FIG. 13, the difference between Embodiment 4 and Embodiment 3 is that Embodiment 4 is also equipped with an extension device (7) and two adjacent transport devices (1) are connected through one extension device (7). The extension device (7) comprises a second lifting subassembly (71), a sixth transmission subassembly (72), a seventh transmission subassembly (73), an eighth transmission subassembly (74), a fifth connecting rod (75), a sixth connecting rod (76), a seventh connecting rod (77) and an eighth connecting rod (78), wherein the seventh transmission subassembly (73) and the eighth transmission subassembly (74) are located underneath the sixth transmission subassembly (72).

As shown in FIG. 14, the second lifting subassembly (71) also comprises a second baseplate (712), a second guide rail (713), a second sliding block (711), a second screw (714) and a second nut (715); the second baseplate (712) is movably suspended on the sixth transmission subassembly (72); the second guide rail (713) and the second screw (714) are located on the second baseplate (712); on both sides of the second sliding block (711) are a third pivoting shaft (7111) and a fourth pivoting shaft (7112) respectively; the second sliding block (711) is located on the second baseplate (712); the second guide rail (713) and the second screw (714) pass through the second sliding block (711); the second sliding block (711) slides along the second guide rail (713); the second nut (715) sleeves the second screw (714) and slides along the second screw (714); the second nut (715) rotates and slides around the second screw (714) to drive the second sliding block (711) to lift up and down along the second guide rail (713);

The sixth transmission subassembly (72) comprises a fourth driving wheel (721), a sixth transmission shaft (722) and a sixth rear belt pulley (723), wherein the fourth driving wheel (721) is axially and slidably installed at the front end of the sixth transmission shaft (722), and the sixth rear belt pulley (723) are fixed at the rear end of the sixth transmission shaft (722).

The seventh transmission subassembly (73) comprises a seventh transmission shaft (731), a seventh front belt pulley (732) and a seventh rear belt pulley (733), wherein the seventh transmission shaft (731) is located on the second baseplate (712), the seventh front belt pulley (732) and the seventh rear belt pulley (733) are fixed onto the seventh transmission shaft (731). The eighth transmission subassembly (74) comprises an eighth transmission shaft (741) and an eighth belt pulley (742), wherein the eighth transmission shaft (741) is located on the second baseplate (712), and the eighth belt pulley (742) is fixed onto the eighth transmission shaft (741);

The extension device (7) is located between two adjacent transport devices (1); the front end of the fifth connecting rod (75) is connected with the third transmission shaft (231) of the previous transport device (1) and the rear end of the fifth connecting rod (75) is connected with the sixth transmission shaft (722) to realize the connection of the third transmission subassembly (23) of the previous transport device (1) with the sixth transmission subassembly (72) of the extension device (7); the front end of the sixth connecting rod (76) is connected with the third transmission shaft (231) of the previous transport device (1) and the rear end of the sixth connecting rod (76) is connected with the second sliding block (711) to realize the connection of the third transmission subassembly (23) of the previous transport device (1) with the second lifting subassembly (71) of the extension device (7); the front end of the seventh connecting rod (77) is connected with the second transmission shaft (221) of the next transport device (1) and the rear end of the seventh connecting rod (77) is connected with the sixth transmission shaft (722) to realize the connection of the second transmission subassembly (22) of the next transport device (1) with the sixth transmission subassembly (72) of the extension device (7); the front end of the eight connecting rod (78) is connected with the second transmission shaft (221) of the next transport device (1) and the rear end of the eighth connecting rod (78) is connected with the second sliding block (711) to realize the connection of the second transmission subassembly (22) of the next transport device (1) with the second lifting subassembly (71) of the extension device (7) and thus form the second cableway rope clamping extent regulating mechanism.

The third driving wheel (232) and the fourth driving wheel (721) of the previous transport device (1) as well as the second driving wheel (222) of the next transport device (1) form the second cableway rope clamping area, wherein the fourth driving wheel (721), the second driving wheel (222) and the third driving wheel (232) are inflatable tyres with cableway rope clamping grooves (6).

Among the third transmission subassembly (23), the seventh transmission subassembly (73) and the eighth transmission subassembly (74) of the previous transport device (1) as well as the second transmission subassembly (22) of the next transport device (1) is a fourth transmission belt (14), wherein the fourth transmission belt (14) is a transmission belt and it sleeves the third rear belt pulley (234), the seventh rear belt pulley (733) and the eighth belt pulley (742) of the previous transport device (1) as well as the second rear belt pulley (224) of the next transport device (1)

so that the third transmission subassembly (23) of the previous transport device (1) drives the seventh transmission subassembly (73) and the eighth transmission subassembly (74) of the previous transport device (1) as well as the second transmission subassembly (22) of the next transport device (1) to rotate through the fourth transmission belt (14). Between the sixth transmission subassembly (72) and the seventh transmission subassembly (73) is a fifth transmission belt (15); the fifth transmission belt (15) is a transmission belt and sleeves the sixth belt pulley (723) and the seventh front belt pulley (732) so that the seventh transmission subassembly (73) drives the sixth transmission subassembly (72) to rotate through the fifth transmission belt (15).

Moreover, the transmission mechanism (3) of Embodiment 4 is equipped with a power source (5) only, wherein the power source (5) is suspended on the hook (43) of the pull arm (4); between the power source (5) and the first transmission subassembly (21) of the transport device (1) is a first transmission belt (11); the first transmission belt (11) is a transmission belt and the transmission mechanism (3) drives the first transmission subassembly (21) to rotate through the first transmission belt (11).

Moreover, two adjacent transport devices (1) are connected through one extension device (7) so that a plurality of transport devices suspended on the cableway rope are connected together and the motive power of the previous transport device (1) is transmitted to the next transport device (1) through the extension device (7); the user can adjust the number of transport devices (1) as per the load carrying capacity; a plurality of transport devices (1) can share one power source (5) to improve the transport efficiency of the cableway self-propelled transport facility.

In the above-mentioned Embodiments 1~4, the cableway rope joints or turns also can be equipped with crossway devices (not shown in the drawings) so that the transport devices (1) can smoothly pass through the cableway rope joints or make turns and change routes and thus expand the scope of application of the cableway self-propelled transport facility.

What is claimed is:

1. A cableway self-propelled transport facility, comprising at least one transport device (1) traveling along a cableway rope, wherein each transport device (1) comprises a slide regulating mechanism (2), a transmission mechanism (3) and a pull arm (4); the slide regulating mechanism (2) and the transmission mechanism (3) are in flexible connection with the pull arm (4) respectively;

the slide regulating mechanism (2) comprises a first lifting subassembly (20), a first transmission subassembly (21), a second transmission subassembly (22), a third transmission subassembly (23), a first connecting rod (26), a second connecting rod (27), a third connecting rod (28) and a fourth connecting rod (29); the first lifting subassembly (20) is movably suspended on the first transmission subassembly (21); the first lifting subassembly (20) comprises a first sliding block (203) capable of sliding up and down, the second transmission subassembly (22) and the third transmission subassembly (23) are located on both sides of the first transmission subassembly (21) respectively, the second transmission subassembly (22) and the first transmission subassembly (21) are connected through the first connecting rod (26), the second transmission subassembly (22) and the first sliding block (203) are connected through the second connecting rod (27), the third transmission subassembly (23) and the first transmission subassembly (21) are connected through the third connecting rod (28), the third transmission subassembly (23) and the first sliding block (203) are connected through the fourth connecting rod (29); the first transmission subassembly (21), the second transmission subassembly (22) and the third transmission subassembly (23) form a cableway rope clamping area; the first lifting subassembly (20) regulates a clamping degree of the cableway rope clamping area, or lowers the second transmission subassembly (22) and the third transmission subassembly (23) at cableway rope joints and turns so that a second driving wheel (222) and a third driving wheel (232) are temporarily separated from the cableway rope, so that only a first driving wheel (212) is utilized to drive the slide regulating mechanism (2) to smoothly pass through the cableway rope joints or turns;

the transmission mechanism (3) drives the first transmission subassembly (21), the second transmission subassembly (22) and the third transmission subassembly (23) to rotate; a rotational direction of the second transmission subassembly (22) and the third transmission subassembly (23) is reverse compared with a rotational direction of the first transmission subassembly (21).

2. The cableway self-propelled transport facility in accordance with claim 1, wherein the slide regulating mechanism (2) also comprises a fourth 1 transmission subassembly (24) and a fifth transmission subassembly (25); the fourth transmission subassembly (24) and the fifth transmission subassembly (25) are located under the first transmission subassembly (21); a first transmission belt (11) is arranged between the first transmission subassembly (21) and the transmission mechanism (3); the transmission mechanism (3) drives the first transmission subassembly (21) to rotate via the first transmission belt (11); a second transmission belt (12) is provided between the first transmission subassembly (21) and the fourth transmission subassembly (24); the first transmission subassembly (21) drives the fourth transmission subassembly (24) to rotate via the second transmission belt (12); a third transmission belt (13) is provided between the second transmission subassembly (22), the fourth transmission subassembly (24), the fifth transmission subassembly (25), and the third transmission subassembly (23); the fourth transmission subassembly (24) drives the second transmission subassembly (22), the third transmission subassembly (23) and the fifth transmission subassembly (25) to rotate via the third transmission belt (13).

3. The cableway self-propelled transport facility in accordance with claim 2, also comprising a plurality of extension devices (7), two adjacent transport devices (1) are connected through one extension device (7); each extension device (7) comprises a sixth transmission subassembly (72), a seventh transmission subassembly (73), an eighth transmission subassembly (74), a second lifting subassembly (71), a fifth connecting rod (75), a sixth connecting rod (76), a seventh connecting rod (77) and an eighth connecting rod (78); the second lifting subassembly (71) is movably suspended on the sixth transmission subassembly (72), the second lifting subassembly (71) comprises a second sliding block (711) capable of sliding up and down, the seventh transmission subassembly (73) and the eighth transmission subassembly (74) are located under the sixth transmission subassembly (72); the third transmission subassembly (23) of a previous transport device (1) and the sixth transmission subassembly (72) of the extension device (7) are connected through the fifth connecting rod (75); the third transmission subassembly

(23) of the previous transport device (1) and the second sliding block (711) of the extension device (7) are connected through the sixth connecting rod (76); the second transmission subassembly (22) of a next transport device (1) and the sixth transmission subassembly (72) of the extension device (7) are connected through the seventh connecting rod (77); the second transmission subassembly (22) of the next transport device (1) and the sliding block (711) of the extension device (7) are connected through the eighth connecting rod (78); the second lifting subassembly (71) regulates a clamping degree of the cableway rope clamping area formed by the third driving wheel (232) of the previous transport device (1), the fourth driving wheel (721) of the extension device (7) and the second driving wheel (222) of the next transport device (1).

4. The cableway self-propelled transport facility in accordance with claim 3, wherein a fourth transmission belt (14) is mounted among the seventh transmission subassembly (73), the eighth transmission subassembly (74), the third transmission subassembly (23) of the previous transport device (1) and the second transmission subassembly (22) of the next transport device (1); the third transmission subassembly (23) of the previous transport device (1) drives the seventh transmission subassembly (73), the eight transmission subassembly (74) and the second transmission subassembly (22) of the next transport device (1) to rotate via the fourth transmission belt (14) and thus drives the second transmission subassembly (22) of the next transport device (1) to rotate; the second transmission subassembly (22) of the next transport device (1) successively transmits rotation to still a next transport device through the second transmission belt (12) and the third transmission belt (13); a fifth transmission belt (15) is provided between the sixth transmission subassembly (72) and the seventh transmission subassembly (73); the seventh transmission subassembly (73) drives the sixth transmission subassembly (72) to rotate through the fifth transmission belt (15).

5. The cableway self-propelled transport facility in accordance with claim 2, wherein the transmission mechanism (3) comprises a frame (31), a ninth transmission subassembly (32), a tenth transmission subassembly (33), and a transmission reversing subassembly (34); on one side of the frame (31) is designed with an opening (311); the pull arm (4) comprises an upper pull arm part (41) and a lower pull arm part (42); an upper end of the upper pull arm part (41) is movably suspended on the first transmission subassembly (21), a lower end of the upper pull arm part (41) is rotatably connected with an upper end of the lower pull arm part (42), the pull arm (4) passes through the opening (311); a lower end of the lower pull arm part (42) provided with a hook (43) which is capable of suspending objects; the ninth transmission subassembly (32) is designed rotatably on said one side of the frame (31), the ninth transmission subassembly (32) passes through the opening (311) and is connected with the pull arm (4); the pull arm (4) is rotatable with the ninth transmission subassembly (32) as a center of rotation; the opening (311) limits a rotation angle of the pull arm (4); the tenth transmission subassembly (33) is designed rotatably on another side of the frame (31), the transmission reversing subassembly (34) is rotatably designed at a center of the frame (31), the transmission reversing subassembly (34) located in the frame (31) is rotatably connected with the ninth transmission subassembly (32) and the tenth transmission subassembly (33), the transmission reversing subassembly (34) extending through the frame (31) is connected with a transmission reversing shaft (341) of an adjacent transport device (1).

6. The cableway self-propelled transport facility in accordance with claim 5, wherein the first transmission belt (11) is located between the ninth transmission subassembly (32) and the first transmission subassembly (21); the ninth transmission subassembly (32) drives the first transmission subassembly (21) to rotate through the first transmission belt (11).

7. The cableway self-propelled transport facility in accordance with claim 6, also comprising a power source (5) suspended on the hook (43), at least one of said at least one transport device (1) is connected with the power source (5); a sixth transmission belt (16) is provided between the tenth transmission subassembly (33) and the power source (5); the power source (5) utilizes the sixth transmission belt (16) to transmit power to the tenth transmission subassembly (33), and thus to the transmission reversing subassembly (34) and in turns to the ninth transmission subassembly (32); other transport devices (1) not connected with the power source (5) are defined as passive transport devices (1).

8. The cableway self-propelled transport facility in accordance with claim 2, wherein the first lifting subassembly (20) also comprises a first baseplate (201), a first guide rail (202), said first sliding block (203), a first screw (204) and a first nut (205); the first baseplate (201) is movably suspended on the first transmission subassembly (21); the first guide rail (202) and the first screw (204) are located on the first baseplate (201); on both sides of the first sliding block (203) are a first pivoting shaft (206) and a second pivoting shaft (207) respectively;

the first sliding block (203) is located on the first baseplate (201), the first guide rail (202) and the first screw (204) pass through the first sliding block (203); the first sliding block (203) is slidable along the first guide rail (202), the first nut (205) sleeves the first screw (204) and is slidable along the first screw (204); as the first nut (205) rotates, and the first nut (205) is slidable along the first screw (204) and thus drives the first sliding block (203) to slide up and down along the first guide rail (202);

the fourth transmission subassembly (24) comprises a fourth transmission shaft (241), a fourth front belt pulley (242) and a fourth rear belt pulley (243); the fourth transmission shaft (241) is located on the first baseplate (201), the fourth front belt pulley (242) and the fourth rear belt pulley (243) are fixed onto the fourth transmission shaft (241); the fifth transmission subassembly (25) comprises a fifth transmission shaft (251) and a fifth belt pulley (252), the fifth transmission shaft (251) is located on the first baseplate (201), the fifth belt pulley (252) is fixed onto the fifth transmission shaft (251); the first transmission subassembly (21) comprises the first driving wheel (212), a first transmission shaft (211), a first front belt pulley (213) and a first rear belt pulley (214); the first driving wheel (212) is axially located at a front end of the first transmission shaft (211), the first front belt pulley (213) is fixed in a middle of the first transmission shaft (211), the first rear belt pulley (214) is fixed at a rear end of the first transmission shaft (11); the second transmission subassembly (22) comprises the second driving wheel (222), a second transmission shaft (221), a second front belt pulley (223), and a second rear belt pulley (224), the second driving wheel (222) is axially and movably located at a front end of the second transmission shaft (221), the second front belt pulley (223) and the second rear belt pulley (224) are fixed at a rear end of the second transmission shaft (221); the third transmission subassembly (23) comprises the third driving wheel (232), a third transmission shaft (231), a third front belt pulley (233) and a third rear belt pulley (234), the third driving wheel (232) is axially mounted at a front end of the third transmission shaft (231), the third front belt pulley (233) and the third rear belt pulley (234) are fixed at a rear end of the third transmission shaft (231);

a front end of the first connecting rod (26) is connected with the first transmission shaft (211), a rear end of the first connecting rod (26) is connected with the second transmission shaft (221); a front end of the second connecting rod (27) is connected with the first pivoting shaft (206) of the first sliding block (203), and a rear end of the second connecting rod (27) is connected with the second transmission shaft (221); a front end of the third connecting rod (28) is connected with the first transmission shaft (211), a rear end of the third connecting rod (28) is connected with the third transmission shaft (231); a front end of the fourth connecting rod (29) is connected with the second pivoting shaft (207) of the first siding block (203), and a rear end of the fourth connecting rod (29) is connected with the third transmission shaft (231); The first driving wheel (212) of the first transmission subassembly (21), the second driving wheel (222) of the second transmission subassembly (22), and the third driving wheel (232) of the third transmission subassembly (23) form the cableway rope clamping area; the second transmission belt (12) sleeves the first front belt pulley (213) and the fourth front belt pulley (242); the third transmission belt (13) sleeves the second front belt pulley (223), the third front belt pulley (233), the fourth rear belt pulley (243) and the fifth belt pulley (252).

9. The cableway self-propelled transport facility in accordance with claim 4, wherein the second lifting subassembly (71) also comprises a second baseplate (712), a second guide rail (713), a second sliding block (711), a second screw (714) and a second nut (715); the second baseplate (712) is movably suspended on the sixth transmission subassembly (72); the second guide rail (713) and the second screw (714) are located on the second baseplate (712); on both sides of the second sliding block (711) are a third pivoting shaft (7111) and a fourth pivoting shaft (7112) respectively; the second sliding block (711) is located on the second baseplate (712); the second guide rail (713) and the second screw (714) pass through the second sliding block (711); the second sliding block (711) is slidable along the second guide rail (713); the second nut (715) sleeves the second screw (714) and slides is slidable along the second screw (714); as the second nut (715) rotates, slides the second nut (715) is slidable along the second screw (714) to drive the second sliding block (711) to slide up and down along the second guide rail (713);

the seventh transmission subassembly (73) comprises a seventh transmission shaft (731), a seventh front belt pulley (732) and a seventh rear belt pulley (733); the seventh transmission shaft (731) is located on the second baseplate (712), the seventh front belt pulley (732) and the seventh rear belt pulley (733) are fixed onto the seventh transmission shaft (731); the eighth transmission subassembly (74) comprises an eighth transmission shaft (741) and an eighth belt pulley (742), the eighth transmission shaft (741) is located on the second baseplate (712), the eighth belt pulley (742) is fixed onto the eighth transmission shaft (741);

the sixth transmission subassembly (72) comprises a fourth driving wheel (721), a sixth transmission shaft (722) and a sixth belt pulley (723); the fourth driving wheel (721) is axially installed at a front end of the sixth transmission shaft (722); the sixth belt pulley (723) is fixed at a rear end of the sixth transmission shaft (722); a front end of the fifth connecting rod (75) is connected with the third transmission shaft (231) of the previous transport device (1), and a rear end of the fifth connecting rod (75) is connected with the sixth transmission shaft (722) of the expansion-mechanism extension device (7); a front end of the sixth connecting rod (76) is connected with the third transmission shaft (231) of the previous transport device (1), and a rear end of the sixth connecting rod (76) is connected with the third pivoting shaft (7111) of the second sliding block (711) of the extension device (7); a front end of the seventh connecting rod (77) is connected with the second transmission shaft (221) of the next transport device (1), and a rear end of the seventh connecting rod (77) is connected with the sixth transmission shaft (722) of the extension device (7); a front end of the eighth connecting rod (78) is connected with the second transmission shaft (221) of the next transport device (1), and a rear end of the eighth connecting rod (78) is connected with the fourth pivoting shaft (7112) of the second sliding block (711) of the extension device (7);

the fourth transmission belt (14) sleeves the third rear belt pulley (234) of the previous transport device (1), the seventh rear belt pulley (733), the eighth belt pulley (742), as well as the second rear belt pulley (224) of the next transport device (1); the fifth transmission belt (15) sleeves the sixth belt pulley (723) and the seventh belt pulley (732).

10. The cableway self-propelled transport facility in accordance with claim 8, wherein the first driving wheel (212), the second driving wheel (222) and the third driving wheel (232) are inflatable tyres with cableway rope clamping grooves (6) or rubber tyres with cableway rope clamping grooves (6); two ends of each inflatable or rubber tyre are equipped with metal protecting covers (61) to prevent the cableway rope from separating from the inflatable or rubber tyre when the cableway rope is moving.

11. The cableway self-propelled transport facility in accordance with claim 1, wherein the pull arm (4) comprises an upper pull arm part (41) and a lower pull arm part (42); the upper pull arm part (41) comprises a beam (411), a first shaft sleeve (412) and a second shaft sleeve (413); the first shaft sleeve (412) and the second shaft sleeve (412) are fixed under both sides of the beam (411) respectively; a middle of the lower pull arm part (42) is designed with a shaft hole (421), a lower end of the lower pull arm part (42) is designed with a hook (43) capable of suspending goods to be transported or a power source (5), the upper pull arm part (41) and the lower pull arm part (42) are rotatably connected together; the slide regulating mechanism (2) is movably installed onto the upper pull arm part (41), and the transmission mechanism (3) is movably installed onto the lower pull arm part (42).

* * * * *